United States Patent
Otera

(10) Patent No.: US 6,582,134 B2
(45) Date of Patent: Jun. 24, 2003

(54) OPTICAL FIBER CONNECTOR

(75) Inventor: Shozo Otera, Otsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/052,508

(22) Filed: Jan. 23, 2002

(65) Prior Publication Data

US 2002/0114582 A1 Aug. 22, 2002

(30) Foreign Application Priority Data

Feb. 22, 2001 (JP) ........................................ 2001-046487

(51) Int. Cl.[7] ................................................ G02B 6/38
(52) U.S. Cl. ...................................................... 385/65
(58) Field of Search .............................. 385/52–54, 59, 385/63, 65, 71, 83, 147

(56) References Cited

U.S. PATENT DOCUMENTS 6,254,280 B1 * 7/2001 Hubbauer et al. ............ 385/65
6,352,372 B1 * 3/2002 Shahid ......................... 385/59
6,424,785 B1 * 7/2002 Melchor ...................... 385/139
6,474,877 B1 * 11/2002 Shahid ......................... 385/71
6,478,475 B2 * 11/2002 Schofield et al. ............. 385/65

* cited by examiner

Primary Examiner—Khiem Nguyen
(74) Attorney, Agent, or Firm—Keating & Bennett, LLP

(57) ABSTRACT

An optical fiber connector includes first and second holders for holding first and second connection ends of first and second optical fibers, respectively, so that fiber end surfaces of the connection ends are butt-spliced by coupling the holders together. The first holder includes a first holder portion having a first holding groove for holding the top half of the first connection end and for allowing the bottom half thereof to be exposed. The first holding groove includes a pair of inclined planes for aligning the top half. The second holder is similar to the first holder except that the second holder is constructed such that the bottom half of the second connection end is held and aligned while the top half thereof is exposed. Additionally, the fiber end surfaces recede from the end surfaces of the corresponding holding portions, and the holding grooves oppose each other sandwiching the optical fiber therebetween. Thus, the receded portion of the first holding groove aligns the second optical fiber.

18 Claims, 5 Drawing Sheets

OPTICAL FIBER CONNECTOR

BACKGROUND OF THE INVENTION

1. Field of the Invention

The present invention relates to an optical fiber connector for butt-splicing end surfaces of a pair of optical fibers.

2. Description of the Related Art

An MT type connector in FIG. 7 is an example of a known optical fiber connector. As shown in FIG. 7, the MT type connector for multi-fiber connections includes a first resin plug 22a and a second resin plug 22b to which first optical fibers 21a (not shown) and second optical fibers 21b are fixed, respectively, a pair of guide holes (not shown) formed in the first plugs 22a, a pair of guide pins 23 mounted on the second plug 22b, and a flat metal clamp spring 24. With this configuration, the end surfaces of the optical fibers 21a and 21b are exposed at the splicing side from the end surfaces of the corresponding plugs 22a and 22b and are polished. Then, the first and the second plugs 22a and 22b are coupled by fitting the pair of guide pins 23 into the corresponding guide holes, resulting in tight contact between the polished end surfaces of the optical fibers 21a and the corresponding optical fibers 21b. The clamp spring 24 is used for maintaining the connection between the first optical fibers 21a and the corresponding second optical fibers 21b.

The MT type connector is capable of high-density mounting and has excellent optical characteristics. However, since it is difficult to form the end surfaces of the optical fibers 21a and 21b to have a spherical shape, a refractive index matching agent is used for filling the spaces between the opposing end surfaces of the optical fibers 21a and 21b so as to reduce the reflection at the spaces. Unfortunately, the refractive index matching agent is not always desirable because the refractive index of the refractive index matching agent is a function of temperature. That is, the refractive index of the refractive index matching agent is highly temperature dependent.

Furthermore, it has been pointed out that attaching and removing the clamp spring 24 used for maintaining the overall structure of the MT type connector as described above is troublesome.

A BF (Bare Fiber) connector is another example of a known optical fiber connector. FIGS. 8A and 8B, respectively, illustrate a state in which the connection is not yet performed and another state in which the connection is complete. The BF connector performs direct butt-splicing between the opposing end surfaces of a pair of optical fibers 31 without a refractive index matching agent.

The BF connector includes a pair of plugs 32 to which the pair of optical fibers 31 are fixed, and an adapter 33 for coupling the opposing plugs 32. Furthermore, each plug 32 includes a holding portion 32a, disposed at the side opposite to the splicing side, for holding the corresponding optical fiber 31 in a cantilever fashion, and a hollow 32b formed therein, having an opening facing toward the mating plug 32, to allow the corresponding optical fiber 31 to buckle. One of the optical fibers 31 fixed in the pair of plugs 32 protrudes by a predetermined distance $L_1$ from the end surface of the opening.

The adapter 33 is constructed so as to connect and fix the pair of plugs 32 inserted from the corresponding ends of the adapter 33, and includes an aligner 34 disposed coaxially therewith. The aligner 34 includes an alignment hole referred to as a micro-hole 35 arranged coaxially therewith so as to receive and align the pair of optical fibers 31 which are fixed in the respective plugs 32 and which are inserted from the corresponding ends thereof. The micro-hole 35 supports the pair of optical fibers 31 inserted from the corresponding ends thereof. The optical fiber 31 protruding by the predetermined distance $L_1$ from the end of the opening of the corresponding plug 32 buckles in the corresponding hollow 32b, resulting in butt-splicing of the end surfaces of the pair of optical fibers 31 in the micro-hole 35.

That is, a pushing force is generated in the buckled optical fiber 31 along the axial direction thereof and pushes the end surface thereof against the end surface of the mating optical fiber 31, thus achieving a close contact between both end surfaces of the pair of optical fibers 31 without a refractive index matching agent. The buckling length L of the buckled optical fiber 31 is defined by the following equation:

$$L=2\pi(EI/P)^{1/2}$$

where P represents a buckling force, and E and I represent the elastic modulus and the second moment of area of the optical fiber 31, respectively.

Further, assuming that an X-axis and a Y-axis lie, respectively, along and perpendicular to the axial direction of the optical fiber 31, a deflection y in the Y-axis direction along x in the X-axis is defined by the following equation:

$$y=\delta/2\{1-\cos(2\pi x/L)\}$$

where $\delta$ represents the maximum deflection of the optical fiber 31.

The radius of curvature R of the optical fiber 31 is determined by the following equation:

$$1/R=y''/(1+y'^2)^{3/2}$$

Accordingly, the resulting buckling length $L+\Delta L$ of the optical fiber 31 is defined by the following equation:

$$L+\Delta L=\int_0^L \sqrt{(1+(y')^2)}dx$$

where $\Delta L$ represents a buckling deformation of the optical fiber.

With these equations, the obtained radius of curvature R is about 6 mm when the buckling length L is 7 mm and the buckling deformation $\Delta L$ is 50 µm.

The BF connectors have the following problems. The BF connector has the pair of hollows 32b formed in the respective plugs 32 and holds the pair of optical fibers 31 in a cantilever fashion. This configuration makes it difficult for the optical fibers 31 to be accurately aligned since the buckling directions of the optical fibers 31 are not determined in a uniform manner, and therefore it is difficult for the optical fibers 31 to be inserted into the micro-hole 35 disposed in the adapter 33. A smaller clearance between the outer surface of the optical fibers 31 and the inner surface of the micro-hole 35 makes it more difficult for the optical fibers 31 to be inserted and a larger clearance between the outer surface of the optical fibers 31 and the inner surface of the micro-hole 35 causes displacement of the inserted optical fibers 31 in the micro-hole 35, resulting in an increased insertion loss.

For the BF connector, the recommended amounts of the buckling length L and the buckling deformation $\Delta L$ are 7 mm and 50 µm, respectively, leading to about 6 mm for the radius of curvature R. This radius of curvature R is much smaller than the allowable radius of curvature of typical optical fibers, i.e., about 10 mm. Accordingly, this small radius of curvature may cause the buckled optical fiber 31 to crack. To avoid this, it is necessary to coat the optical fibers 31 with carbon. However, this kind of treatment involves a substantial increase in cost.

SUMMARY OF THE INVENTION

In order to overcome the problems described above, preferred embodiments of the present invention provide an optical fiber connector for reliably and accurately aligning optical fibers and allowing the optical fibers to surely and easily have a radius of curvature that is substantially equal to or larger than the allowable radius of curvature.

According to a preferred embodiment of the present invention, an optical fiber connector includes a first holder for holding a first connection end of a first optical fiber and a second holder for holding a second connection end of a second optical fiber. The first and the second holders include a first holder portion and a second holder portion disposed therein, respectively. The first and the second holder portions include a first holding groove and a second holding groove disposed therein, respectively. The first holding groove holds the top half of the first connection end and allows the bottom half thereof to be exposed, and the second holding groove holds the bottom half of the second connection end and allows the top half thereof to be exposed, where the top half and the bottom half are defined with respect to the central axis of any of the first and the second optical fibers. The first and the second holding grooves include a pair of first inclined planes and a pair of second inclined planes, respectively, disposed therein, where the first inclined planes align the top half of the first connection end and the second inclined planes align the bottom half of the second connection end. With this configuration, a first fiber end surface of the first optical fiber recedes from a first holder end surface of the first holder portion and a second fiber end surface of the second optical fiber recedes from a second holder end surface of the second holder portion, the first holding groove and the second holding groove oppose each other sandwiching at least one of the first and the second connection ends therebetween, and the receded portion of the first holding groove aligns the second optical fiber. Thus, the first fiber end surface of the first optical fiber and the second fiber end surface of the second optical fiber are butt-spliced by coupling the first holder and the second holder together.

In the optical fiber connector according to the preferred embodiment of the present invention described in the preceding paragraph, each of the pair of holders preferably has the corresponding holding groove, e.g., a substantially V-shaped groove, disposed in the holding portion of the holder. The holding groove has the pair of inclined planes for aligning and holding either one of the upper half and the bottom half of the corresponding optical fiber with respect to the central axis of the optical fiber. When the pair of holders are coupled to each other, the first holding groove of the first holder portion and the second holding groove of the second holder portion oppose each other sandwiching at least one of the pair of optical fibers therebetween. Accordingly, the second holding groove is automatically aligned while tracking the first optical fiber aligned and held by the first holding groove. Thus, the posture of the second optical fiber aligned and held by the second holding groove is adjusted, achieving highly accurate alignment of the pair of optical fibers, and also leading to a reduced insertion loss while making the holders simple in their construction.

In the optical fiber connector according to preferred embodiments of the present invention, the first receding distance from the first holder end surface to the first fiber end surface is preferably different from the second receding distance from the second holder end surface to the second fiber end surface.

In the optical fiber connector, the first receding distance from the first holder end surface to the first fiber end surface is preferably different from the second receding distance from the second holder end surface to the second fiber end surface. This results in causing a time difference between the time when the holding groove is aligned by the second optical fiber and the time when the first optical fiber is aligned by the second holding groove. That is to say, the first holding groove aligning the first optical fiber slides on the second optical fiber aligned by the second holding groove while tracking the second optical fiber first, and thus allowing the second optical fiber to align the first holding groove, then allowing the second holding groove to align the first optical fiber, surely resulting in a highly accurate alignment of two optical fibers.

In the optical fiber connector according to preferred embodiments of present invention, at least one of the first holder and the second holder may have a guide for allowing the corresponding optical fiber to have a radius of curvature that is substantially equal to or larger than the allowable radius when the corresponding optical fiber is buckled by abutting against the mating optical fiber.

In the optical fiber connector according to preferred embodiments of the present invention, at least one of the first holder and the second holder has a guide for allowing the corresponding optical fiber to have a radius of curvature that is substantially equal to or larger than the allowable radius when the corresponding optical fiber is buckled by abutting against the mating optical fiber, thus preventing the corresponding optical fiber from having a radius smaller than the allowable radius. Accordingly, this guide prevents the buckled optical fiber from cracking and makes it unnecessary to coat the optical fiber for protecting the optical fiber against cracking. Furthermore, although a multi-fiber connector may have variations in the lengths of optical fibers therein, this configuration automatically accommodates the variations in the lengths of the optical fibers.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Referring now to the accompanying drawings, preferred embodiments of the present invention will be described.

Figure 1:
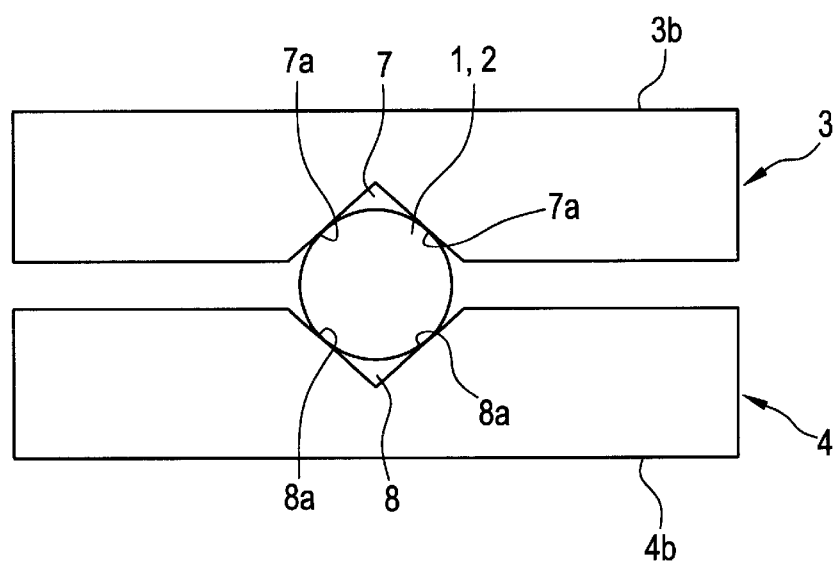
FIG. 1 is an elevational view illustrating a major portion of an optical fiber connector according to a first preferred embodiment of the present invention.
Figure 2:
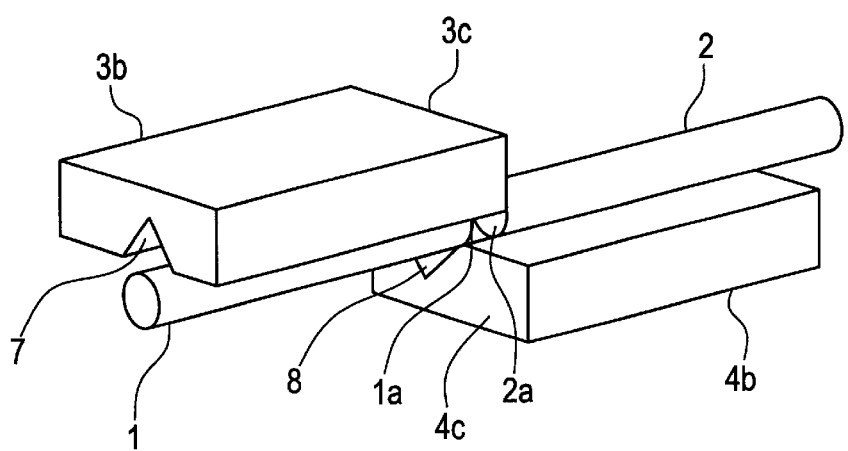
FIG. 2 is a perspective view illustrating the external structure of the major portion of the optical fiber connector.
Figure 3A:
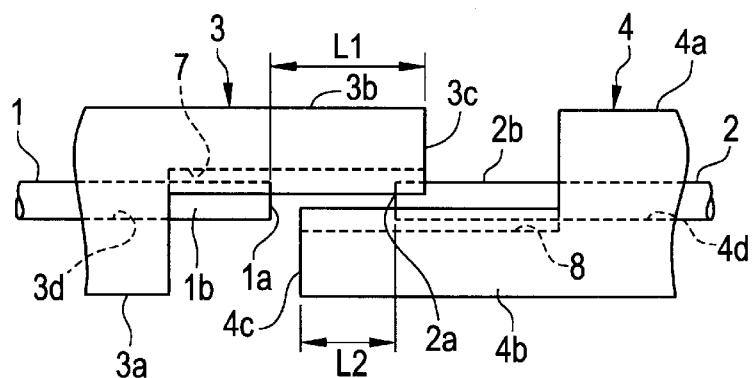
FIGS. 3A and 3B are schematic side views illustrating the assembly procedure of the optical fiber connector.
Figure 3B:
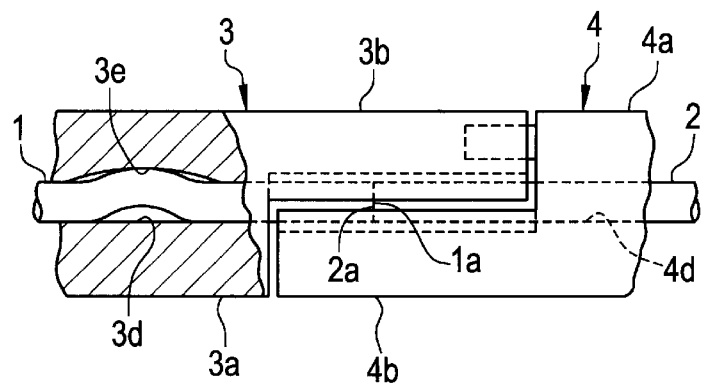
Figure 4:
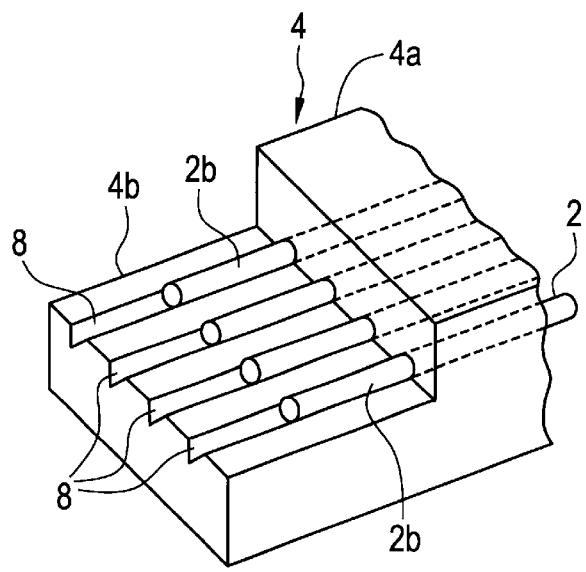
FIG. 4 is a perspective view illustrating the external structure of a second holder.

FIGS. 1 to 4 are illustrations of an optical fiber connector according to a first preferred embodiment of the present invention, wherein FIGS. 1 and 2 are a schematic elevational view and a perspective view illustrating a major portion of the optical fiber connector, FIGS. 3A and 3B are schematic side views illustrating the assembly procedure of the optical fiber connector, and FIG. 4 is a perspective view illustrating a second holder.

In the optical fiber connector according to the first preferred embodiment of the present invention, a first fiber end surface 1a of a first optical fiber 1 and a second fiber end surface 2a of a second optical fiber 2 are butt-spliced by coupling a first holder 3 and a second holder 4, wherein the first holder 3 and the second holder 4 hold a first connection end 1b of the first optical fiber 1 and a second connection end 2b of the second optical fiber 2, respectively.

The first holder 3 is preferably a resin component molded by integrally injecting a first holder base 3a and a first holder portion 3b thereof such that the first holder portion 3b protrudes from the first holder base 3a so as to define a step. The first holder portion 3b has, e.g., four first substantially V-shaped holding grooves 7 formed in its surface, wherein each of the first substantially V-shaped holding grooves 7 holds the top half of the first connection end 1b and allows the bottom half thereof to be exposed, the top half and the bottom half opposing each other with respect to the central axis of the first connection end 1b.

Likewise, the second holder 4 is preferably a resin component molded by integrally injecting a second holder base 4a and a second holder portion 4b thereof so that the second holder portion 4b protrudes from the second holder base 4a so as to define a step. The second holder portion 4b has the same number of second substantially V-shaped holding grooves 8 formed in its surface, wherein each of the second V-shaped holding grooves 8 holds the bottom half of the second connection end 2b and allows the top half thereof to be exposed, the top half and the bottom half opposing each other with respect to the central axis of the second connection end 2b.

Each of the first substantially V-shaped holding grooves 7 has a pair of first inclined planes 7a abutting against the outer peripheral surface of the first optical fiber 1. The first connection end 1b has an unfixed portion, which abuts against the first inclined planes 7a, and which is aligned and held by the first inclined planes 7a. The optical fiber 1 is sandwiched by the first holder base 3a and the first holder portion 3b and is fixed in a first through-hole 3d of the first optical fiber connector 3. Alternatively, the optical fiber 1 may be bonded in the through-hole 3d with an elastic adhesive or other suitable material in a manner such that the optical fiber 1 can move slightly in the axial direction of the optical fiber 1.

The same applies to the second optical fiber 2, the second connection end 2b, the second optical fiber connector 4, the second holder base 4a, the second holder portion 4b, a second through-hole 4d of the second optical fiber connector 4, the second V-shaped holding grooves 8, and a pair of second inclined planes 8a which are disposed in each of the second holding grooves 8 and which abut against the outer peripheral surface of the second optical fiber 2.

In the first through-hole 3d, a guide 3e has a curved surface for holding the optical fiber 1 so that the optical fiber 1 has a radius of curvature that is substantially equal to or larger than the allowable radius of curvature when the first optical fiber 1 is buckled during its connecting operation.

The first fiber end surface 1a recedes by a distance $L_1$ from the first holder end surface 3c toward the first holder base 3a, and the second fiber end surface 2a recedes by a distance $L_2$ from the second holder end surface 4c toward the second holder base 4a, wherein $L_1$ is preferably larger than $L_2$.

When the first holder 3 and the second holder 4 are coupled each other, each of the first holding grooves 7 and the corresponding one of the second holding grooves 8 oppose each other while sandwiching the first optical fiber 1 and the second optical fiber 2 therebetween. The first optical fiber 1 is aligned and held by the first holding groove 7 and the second holding groove 8 for, respectively, holding the top half of the first optical fiber 1 and the bottom half of the first optical fiber 1. The second optical fiber 2 is aligned and held in a similar manner.

A specific example of preferred embodiments of the present invention will now be described. When the first and the second optical fibers 1 and 2 have a diameter of about 125 μm, the first and the second holding grooves 7 and 8 have an opening width of, e.g., about 150 μm, which is slightly smaller than 176 μm (125 μm/2×√2×2). The first and the second optical fibers 1 and 2 abut against the corresponding holding grooves 7 and 8, respectively. As described above, the first fiber end surface 1a and the second fiber end surface 2a are arranged to recede by distances $L_1$ and $L_2$ from the first holder end surface 3c toward the first holder base 3a and from the second holder end surface 4c toward the second holder base 4a, respectively. This arrangement allows the first optical fiber 1 to have a portion which lies near the first holder end surface 3c and does not abut against the corresponding first holding groove 7, and likewise allows the second optical fiber 2 to have a portion which lies near the second holder end surface 4c and does not abut against the corresponding second holding groove 8.

Referring to FIGS. 3A and 3B, the method of splicing the first and the second optical fibers 1 and 2 using the first and the second holders 3 and 4 will be described. As shown in FIG. 3A, the first holder 3 is moved toward the second holder 4 while the receded portion of the first holding groove 7, that is, the portion not abutting against the first optical fiber 1, slides on the second optical fiber 2. Thus, the first holding groove 7 for aligning the first optical fiber 1 is automatically aligned while sliding on the second optical fiber 2, that is to say, the first holder 3 has a self-alignment function. When the first holder 3 is moved further toward the second holder 4, the posture of an end portion of the first optical fiber 1 aligned and held by the first holding groove 7 is adjusted by the corresponding holding groove 8. As a result, the first fiber end surface 1a and the second fiber end surface 2a are precisely aligned and abutted against each other.

The total length of the first connection end 1b and the second connection end 2b is preferably slightly longer than the length of any one of the first holder portion 3b and the second holder portion 4b. Abutment between the first fiber end surface 1a and the second fiber end surface 2a results in the first optical fiber 1 being pushed in leftward in the drawings and being buckled along the guide 3e. This allows the guide 3e to guide the buckled first optical fiber 1 so that it has a radius of curvature that is substantially equal to or larger than the allowable radius of curvature, thus constraining the first optical fiber 1 not to have a radius of curvature smaller than the allowable radius of curvature.

Though not shown in the drawings, while the first and the second fiber end surfaces 1a and 2a are butt-spliced, the first and second holders 3 and 4, sandwiching the first and the second optical fibers 1 and 2 with respect to the central axes thereof, are joined together by an outer casing or other suitable member disposed so as to surround these holders, thus maintaining the butt-splicing between the first and the second optical fibers 1 and 2.

Figure 5A:
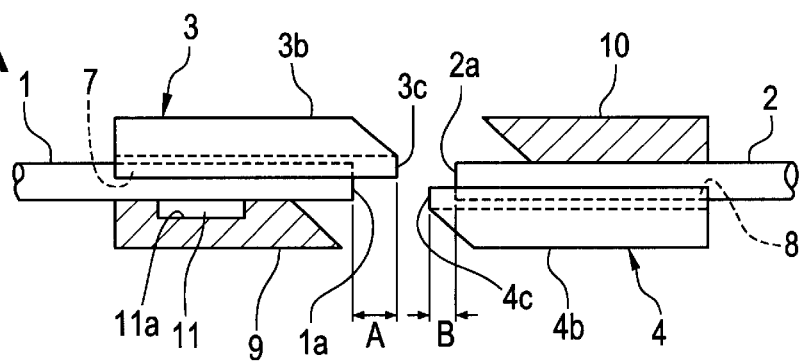
FIGS. 5A to 5D are schematic side views illustrating the assembly procedure of a second preferred embodiment of the present invention.
Figure 5B:
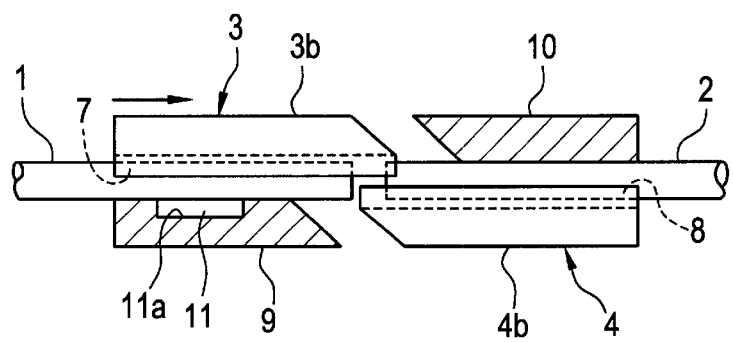
Figure 5C:
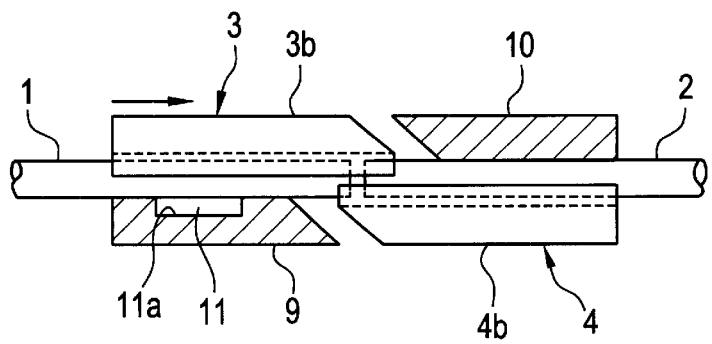
Figure 5D:
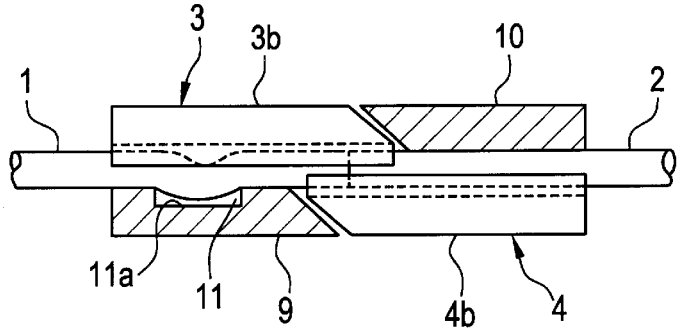
Figure 6:
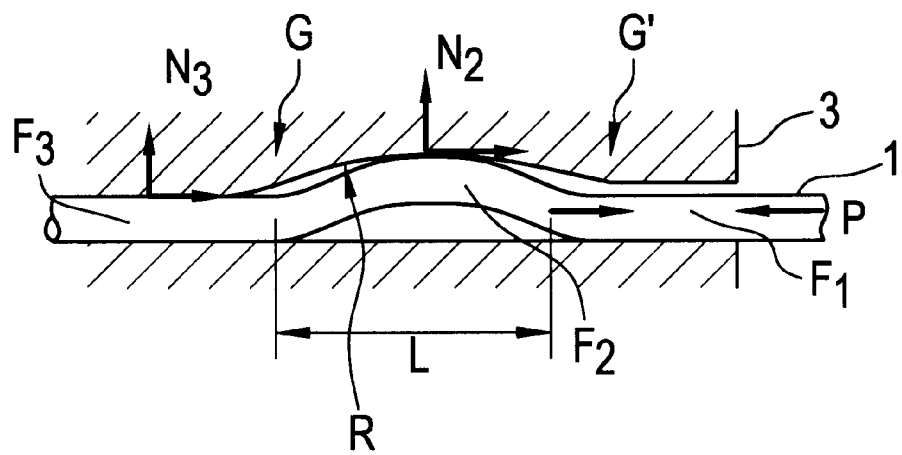
FIG. 6 is an illustration of a butt-spliced optical fiber in a buckled state.
Figure 7:
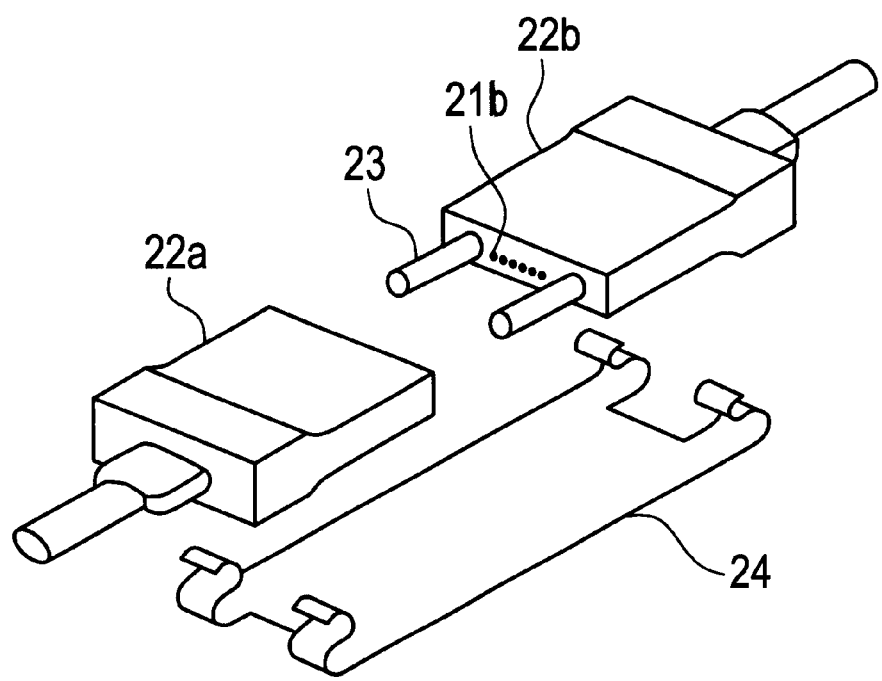
FIG. 7 is a perspective view of a known MT type connector in a disassembled state.
Figure 8A:
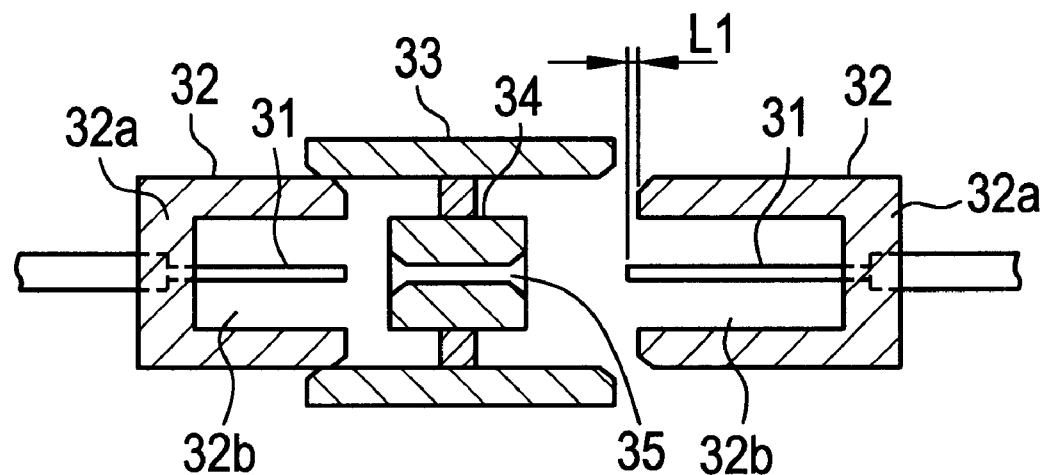
FIGS. 8A and 8B are sectional views of a known BF type connector illustrating a state in which a pair of optical fibers are not yet in mutual connection and a state in which they are in mutual connection, respectively.
Figure 8B:
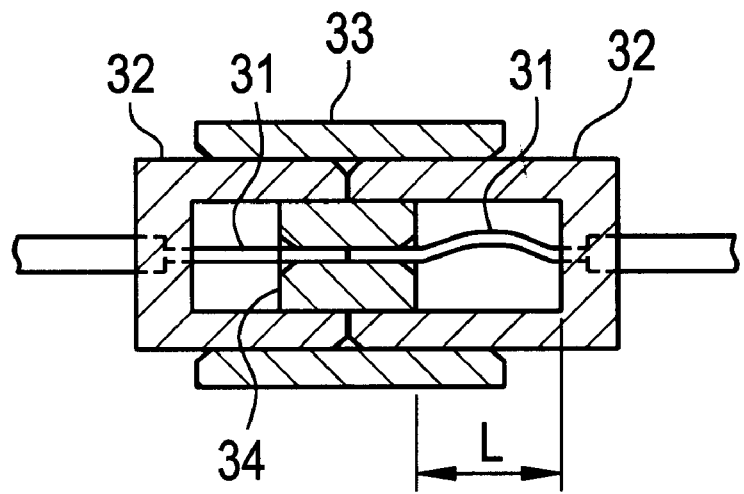

FIGS. 5A to 5D and FIG. 6 are illustrations of an optical fiber connector according to a second preferred embodiment of the present invention, wherein FIGS. 5A to 5D are schematic views illustrating an assembly procedure and the like thereof, and FIG. 6 is a schematic view illustrating a state in which an optical fiber is buckled.

The optical fiber connector according to the second preferred embodiment includes the first holder 3 and the second holder 4 for sandwiching the first optical fiber 1 and the second optical fiber 2 with respect to the central axes thereof, wherein the first fiber end surface 1a and the second fiber end surface 2a are to be butt-spliced. The first holder 3 includes the first holder portion 3b and a first constraining member 9, and the second holder 4 comprises the second holder portion 4b and a second constraining member 10.

The first holder 3 includes the first substantially V-shaped holding groove 7 disposed at the first holder portion 3b against which the first optical fiber 1 abuts. When the optical fiber connector is applied to a multi-fiber connector, the first holder 3 includes a plurality of the first holding grooves 7 arranged in parallel at the first holder portion 3b. The same applies to the second optical fiber 2, the second holder 4, the second holder portion 4b, and the second holding grooves 8.

The first fiber end surface 1a of the first optical fiber 1 abutting against the first holding groove 7 is placed in a position receded from the first holder end surface 3c which lies at the joining side of the first holder 3. The same applies to the second optical fiber 2, the second fiber end surface 2a, the second holder 4, the second holder end surface 4c, and the second holding groove 8. In the above exemplary case, a first receding distance A between the first fiber end surface 1a and the first holder end surface 3c is preferably larger than a second receding distance B between the second fiber end surface 2a and the second holder end surface 4c. That is to say, the first receding distance A is different from the second receding distance B. In addition, the first holder 3 has a portion of the first holding groove 7 which lies near the first holder end surface 3c and does not abut against the first optical fiber 1. Similarly, the second holder 4 has a portion of the second holding groove 8 which lies near the second holder end surface 4c and does not abut against the second optical fiber 2.

The first constraining member 9 constrains the first optical fiber 1 so as to be arranged in the axial direction thereof by a frictional force caused by sandwiching the optical fiber 1 between the first constraining member 9 and the first holder 3. Similarly, the second constraining member 10 constrains the second optical fiber 2. Further, at least the first constraining member 9 has a recess 11 formed therein. The recess 11 preferably has a depth that is substantially equal to the sum of the diameter and the allowable deflection of the first optical fiber 1. The recess 11 has a bottom surface 11a defining a guide for allowing the first optical fiber 1 to have a radius of curvature that is substantially equal to or larger than the allowable radius of curvature by bearing the outer peripheral surface of the first optical fiber 1 which is buckled when the first fiber end surface 1a is butt-spliced against the second fiber end surface 2a.

It will be clearly appreciated that the constraining members 9 and 10 may constrain the optical fibers 1 and 2, respectively, with an elastic adhesive instead of frictional forces caused by sandwiching these optical fibers, and that the bottom 11a of the recess 11 may have a curved surface.

The assembly procedure of the optical fiber connector according to the second preferred embodiment will now be described. As shown in FIG. 5A, the first holder portion 3b and the first constraining member 9 are arranged so as to sandwich the first optical fiber 1. Similarly, the second holder portion 4b and the second constraining member 10 are arranged so as to sandwich the second optical fiber 2. Then, as shown in FIG. 5B, moving the first holder 3 toward the second holder 4 allows the leading portion of the holding groove 7, which does not abut against the first optical fiber 1, to slide on the second optical fiber 2, since the first receding distance A between the first fiber end surface 1a and the first holder end surface 3c is preferably longer than the second receding distance B between the second fiber end surface 2a and the second holder end surface 4c. Moving of the first holder 3 further allows the first optical fiber 1 to slide on the second holding groove 8 of the second holder 4, as shown in FIG. 5C.

In this case, after the first holding groove 7 starts to abut against the second optical fiber 2, the second holding groove 8 starts to abut against the first optical fiber 1. In other words, after the first holding groove 7 is aligned while tracking the second optical fiber 2, the first optical fiber 1 is aligned while tracking the second holding groove 8. This arrangement achieves alignment between the first and the second optical fibers 1 and 2 more surely and reliably compared to the case in which the first and the second receding distances A and B are substantially equal to each other.

Further pushing of the first holder 3 toward the second holder 4 leads to performing the butt-splicing between the first and the second fiber end surfaces 1a and 2a, as shown in FIG. 5D. In addition, the first and the second holding grooves 7 and 8 are mutually aligned via the first and the second optical fibers 1 and 2, while the first and the second optical fibers 1 and 2 are aligned via the first and the second holding grooves 7 and 8. Meanwhile, the first optical fiber 1, the first fiber end surface 1a of which is butt-spliced to the second fiber end surface 2a of the second optical fiber 2, is pushed into the first constraining member 9 and is buckled by the constraint of the constraining member 9. This buckling of the first optical fiber 1 is accepted until the guide, i.e., the bottom 11a of the recess 11 formed in the constraining member 9, contacts the outer peripheral surface of the first optical fiber 1.

While the guide of the recess 11 bears the outer peripheral surface of the first optical fiber 1, the buckled first optical fiber 1 is maintained to have a radius of curvature that is substantially equal to or larger than the allowable radius of curvature, thus preventing the radius of curvature from becoming smaller than the allowable radius of curvature. A frictional force, resulting from a normal force acting normal to the guide surface due to the above buckling, acts between the outer peripheral surface of the buckled first optical fiber 1 and the guide. When a pushing force on the first optical fiber 1 exceeds the frictional force, the first optical fiber 1 slides along the guide, resulting in a smaller pushing force. The first optical fiber 1 slides until the pushing force becomes substantially equal to the frictional force, and eventually comes to rest in a position along the axial direction thereof.

Even when a multi-fiber connector is used, this mechanism can accommodate variations in the lengths of optical fibers in the connector.

In a balanced state in which a normal force is exerted from the guide, the optical fiber is being pushed rightward by a reaction force caused by the buckling deformation thereof, a frictional force due to the normal force exerted from the guide, and another frictional force due to a constraining force exerted from the grooves and the constraining member, and leftward by a buckling force generated so as to counter the these rightward forces. In another balanced state in which a normal force is not exerted from the guide, the optical fiber is being pushed rightward by a reaction force caused by the buckling deformation thereof and a frictional force due to a constraining force exerted from the grooves and the constraining member, and leftward by a buckling force generated so as to counter these rightward forces. Therefore, even when the optical fiber is separated from the guide, the optical fiber is being pushed by the buckling force generated as above described. Since the radius of curvature of the optical fiber is maintained to be at least the allowable radius of curvature, the optical fiber is prevented from being damaged or cracking.

With reference to FIG. 6, buckling of the optical fiber will be discussed. When an optical fiber, for example, having a diameter D of 125 $\mu$m, a buckling length L of 7 mm, and an allowable radius of curvature R of 40 mm buckles, its deflection $\delta$ is 60 $\mu$m. Accordingly, setting an initial clearance between the outer peripheral surface of the optical fiber and the guide equal to the sum of the fiber diameter and the deflection, i.e., 185 $\mu$m (=125 $\mu$m+60 $\mu$m), prevents the optical fiber from entering a state in which the radius of curvature thereof becomes smaller than the allowable radius of curvature of 40 mm, because the optical fiber is constrained as described above. That is to say, when the optical fiber is buckled, a buckling force P of 0.7 N acts on the optical fiber according to the following equation:

$$L=2\pi(EI/P)^{1/2}$$

where E represents the elastic modulus and I represents the second moment of area of the optical fiber.

In this case, a supporting force of the optical fiber acting normal to the guide G–G' indicated in FIG. 6 can be neglected, since the optical fiber has a small buckling angle of 0.017 radian.

Furthermore, the mutual relationships among forces acting on the optical fiber will be discussed. The optical fiber undergoes a leftward pushing force, i.e., a buckling force P, acting thereon in the axial direction thereof. In the rightward direction, the optical fiber has a reaction force $F_1$ caused by the buckling deformation thereof, a frictional force $F_2$ (=$\mu_2 N_2$, where $\mu_2$ is the coefficient of friction between the bottom surface and the optical fiber, and $N_2$ is a supporting force acting normal to the bottom), and a frictional force $F_3$ (=$\mu_3 N_3$, where $\mu_3$ is the coefficient of friction between the inclined planes of the holding groove and the optical fiber, and $N_3$ is a constraining force acting normal to the holding grooves). Consequently, the leftward force P balances with the sum of the rightward forces $F_1$, $F_2$, and $F_3$. Now that $F_1$ and $F_2$ are much smaller than $F_3$, the approximate equation P≅$F_3$ holds. Assuming that the coefficient of static friction between glass and resin is about 0.5, and under the condition in which the buckling force P is overcome by the frictional force $F_3$, the frictional force $F_3$ for constraining the optical fiber and the resulting constraining force $N_3$ are obtained as follows:

$$F_3(=0.5 \times N_3) \geq P(=0.7N) \text{ and } N_3 \geq 1.4N$$

This indicates that an amount 2 N of the constraining force $N_3$ is sufficient for fixing the optical fiber. Alternatively, an elastic adhesive having an elastic force of at least about 0.7 N may be used to fix the optical fiber.

In the optical fiber connector according to the second preferred embodiment, the first and the second constraining members 9 and 10 are preferably arranged at the outer sides, which are opposite to the butt-splicing side, of the first and the second holders 3 and 4, respectively. In addition, the recess 11 formed in the first constraining member 9 has the bottom surface 11a defining a guide for supporting the outer peripheral surface of the buckled optical fiber 1 and allowing the optical fiber 1 to have a radius of curvature that is substantially equal to or more than the allowable radius of curvature. However, this arrangement is not limited to the second preferred embodiment. It will be clearly appreciated that the first and the second constraining members 9 and 10 may be disposed, respectively, on the first and the second holders 3 and 4 of the optical fiber connector according to the first preferred embodiment, and also the recess 11 having the bottom surface 11a defining a guide may be provided in at least one of the first and the second constraining members 9 and 10.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An optical fiber connector comprising:
   a first holder for holding a first connection end of a first optical fiber and a second holder for holding a second connection end of a second optical fiber, the first holder and the second holder including:
      a first holder portion and a second holder portion disposed therein, respectively, the first holder portion and the second holder portion including:
         a first holding groove and a second holding groove disposed therein, respectively, the first holding groove holding the top half of the first connection end and allowing the bottom half thereof to be exposed, the second holding groove holding the bottom half of the second connection end and allowing the top half thereof to be exposed, the top half and the bottom half being defined with respect to a central axis of at least one of the first and the second optical fibers, the first holding groove and the second holding groove including:
            a pair of first inclined planes and a pair of second inclined planes, respectively, provided therein, the first inclined planes aligning the top half of the first connection end and the second inclined planes aligning the bottom half of the second connection end;
   wherein a first fiber end surface of the first optical fibers recedes from a first holder end surface of the first holder portion and a second fiber end surface of the second optical fiber recedes from a second holder end surface of the second holder portion, the first holding groove and the second holding groove oppose each other so as to sandwich at least one of the first connection end and the second connection end therebetween, and the receded portion of the first holding groove aligns the second optical fiber such that the first fiber end surface and the second fiber end surface are butt-spliced by coupling the first holder and the second holder together.

2. The optical fiber connector according to claim 1, wherein a first receding distance from the first holder end surface to the first fiber end surface is different from a second receding distance from the second holder end surface to the second fiber end surface.

3. The optical fiber connector according to claim 1, wherein a first receding distance from the first holder end surface to the first fiber end surface is greater than a second receding distance from the second holder end surface to the second fiber end surface.

4. The optical fiber connector according to claim 1, wherein at least one of the first holder and the second holder has a guide for allowing the corresponding optical fiber to have a radius of curvature that is substantially equal to or larger than an allowable radius when the corresponding optical fiber is buckled by abutting against the mating optical fiber.

5. The optical fiber connector according to claim 1, wherein the first and second holders are made of resin.

6. The optical fiber connector according to claim 1, wherein the first holder includes a first holder base that is mated with the first holder portion such that the first holder portion protrudes from the first holder base so as to define a step.

7. The optical fiber connector according to claim 1, wherein the first holding groove is substantially V-shaped.

8. The optical fiber connector according to claim 1, wherein the first holder portion includes a plurality of the first holding grooves arranged substantially parallel to each other.

9. The optical fiber connector according to claim 1, wherein the second holder includes a second holder base that is mated with the second holder portion such that the second holder portion protrudes from the second holder base so as to define a step.

10. The optical fiber connector according to claim 1, wherein the second holding groove is substantially V-shaped.

11. The optical fiber connector according to claim 1, wherein the second holder portion includes a plurality of the second holding grooves arranged substantially parallel to each other.

12. The optical fiber connector according to claim 4, wherein the guide has a curved surface for holding the optical fiber so that the optical fiber has a radius of curvature that is substantially equal to or larger than the allowable radius of curvature when the first optical fiber is buckled during its connecting operation.

13. The optical fiber connector according to claim 1, wherein the first holder includes a first constraining member arranged to constrain the first optical fiber so as to be arranged in the axial direction thereof by a frictional force caused by sandwiching the first optical fiber between the first constraining member and the first holder.

14. The optical fiber connector according to claim 13, wherein the first constraining member has a recess formed therein and having a depth that is substantially equal to the sum of the diameter and an allowable deflection of the first optical fiber.

15. The optical fiber connector according to claim 13, wherein the recess has a bottom surface that defines a guide for allowing the first optical fiber to have a radius of curvature that is substantially equal to or larger than the allowable radius of curvature.

16. The optical fiber connector according to claim 1, wherein the second holder includes a second constraining member arranged to constrain the second optical fiber so as to be arranged in the axial direction thereof by a frictional force caused by sandwiching the second optical fiber between the second constraining member and the second holder.

17. The optical fiber connector according to claim 16, wherein the second constraining member has a recess formed therein and having a depth that is substantially equal to the sum of the diameter and an allowable deflection of the second optical fiber.

18. The optical fiber connector according to claim 16, wherein the recess has a bottom surface that defines a guide for allowing the second optical fiber to have a radius of curvature that is substantially equal to or larger than the allowable radius of curvature.

* * * * *